Figure 1:
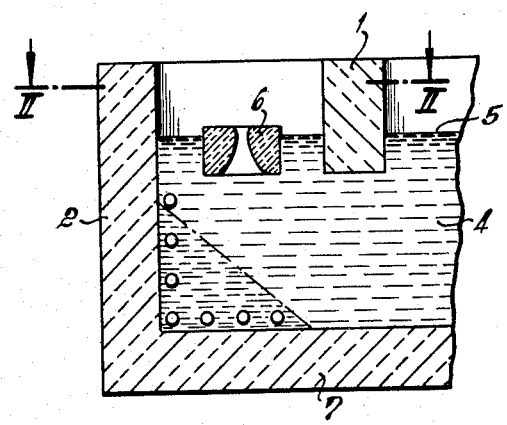

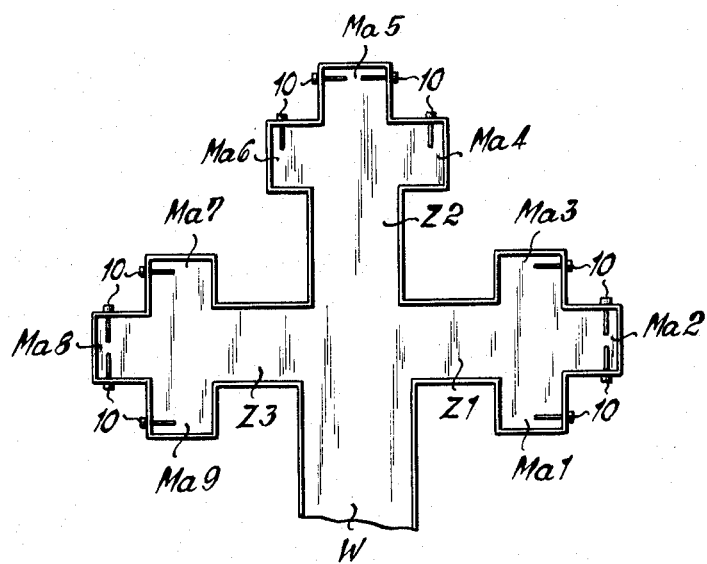

United States Patent Office 3,151,201
Patented Sept. 29, 1964

3,151,201
APPARATUS FOR PREVENTING THE FORMATION OF DEVITRIFICATION LUMPS IN THE DRAWING CHAMBER OF SHEET GLASS DRAWING DEVICES
Georg Kilian, Furth, Bavaria, and Friedrich-Wilhelm Dördelmann, Witten, Germany, assignors to Deutsche Tafelglas Aktiengesellschaft Detag, Furth, Bavaria, Germany, a company of Germany
Filed July 16, 1962, Ser. No. 210,129
Claims priority, application Germany, July 25, 1961, D 36,658
7 Claims. (Cl. 13—6)

This invention relates to a method and to a means for preventing the formation of devitrification lumps in the flow-free zones of the drawing chambers of drawing arrangements for sheet glass, more especially according to the Fourcault process.

It is known that when using this drawing process and the corresponding means, difficulties arise because of the fact that beneath the drawing nozzle at the bottom and in the corners between the external wall and the end walls of the drawing chamber, the temperature of the glass melt falls considerably due to radiation through the walls of the drawing chamber and hereby so-called devitrification lumps are formed. These devitrification lumps become increasingly larger during one drawing period and are inter alia the cause for stopping the drawing operation in order to reheat the drawing chamber. The term "devitrification" is used in this specification to denote the solidified crystalline form of glass, which occurs at a predetermined temperature, the so-called upper devitrification point, which is dependent in each case on the chemical composition of the glass, when the said glass slowly passes through this temperature with the cooling thereof and the glass has sufficient time to carry out crystalline solidification. The result of such a "devitrification" at a certain position in the drawing chamber is the so-called "devitrification lump."

Attempts have been made to prevent the formation of such devitrification lumps by incorporating additional heater elements in the form of electrodes. However, with this arrangement, initially small but then more distinctly apparent defects are already found in the first hours after commencing drawing, which defects were caused by the additional heating with electrodes and produced such persistent strong impurities that the electrode heating had to be rendered inoperative.

In other cases, the use of an electrode heating for the glass melt has been proposed only in conjunction with drawing chambers which are equipped with a so-called "cul-de-sac." By this expression is understood a cul-de-sac-like tank section in which the glass melt forced thereinto does not participate in the tank flow. However, it is necessary with such drawing chambers that a bridge be arranged on the cold side of the drawing nozzle in addition to the bridge arranged on the hot side of said nozzle, it being necessary for said first-mentioned bridge to be at a certain distance from the outside wall of the drawing chamber, with the result that the drawing chamber must be made correspondingly longer when seen in the direction of the longitudinal axis of the adjoining melting tank. The action of the additional electrode heating does not have to be very great in this connection, since the flow-free zones of the drawing chamber, in which the cooling of the glass mass occurs, are displaced to a considerable extent towards the outside wall which is removed further than usual from the drawing nozzle and, as a consequence, does not substantially interfere with the stream of glass flowing to the drawing nozzle. This can, however, only be achieved by corresponding lengthening of the drawing chamber and the provision of a second bridge.

The present invention has for its object to provide a method and a means with which the said disadvantages are avoided, and accordingly consists essentially in that the glass melt is additionally heated in the immediate vicinity of the bottom section disposed beneath the drawing nozzle and of those corners of the drawing chamber which are formed between the said bottom section and the wall sections adjoining it, by controllable and regulatable heat supply by means of heater elements protected against attack from the glass melt, the additional heating being to such a degree that, as known per se, the heat loss resulting from radiation is compensated for. It is advisable for the glass melt to be heated to a temperature which is 20°–30° C. above the upper devitrification point of the glass and is advantageously 950°–960° C.

The uniform heating of certain sections of the drawing chamber which is a result of this arrangement cannot be achieved when using electrode heating, since spatially defined zones of high temperature are produced between the electrodes without all the glass mass or composition being uniformly heated.

A means which is particularly suitable for carrying the method into effect is provided when the heater elements for the additional heating of the glass melt are conducted through the side walls of the drawing chamber transversely of the longitudinal axis of the melting tank and are arranged in the drawing chamber in spaced juxtaposition just above the bottom and in spaced superimposed relation just before the outside and side walls.

The heater elements can be constructed as electric resistance heating elements, advantageously in the form of heating coils, and can be separately arranged with insulation in steel heating tubes which form protective housings, the said tubes comprising a flame-sprayed coating, advantageously of oxides of the third and fourth groups of the Periodic System, such as aluminium oxide, on their external surfaces which come into contact with the glass melt.

Using the method and the means according to the invention, the formation of devitrification lumps with their displeasing secondary phenomena are reliably avoided, since the heat losses otherwise arising because of radiation are compensated for. This arrangement provides the possibility, which is very important for the drawing of sheet glass, that the drawing period in each case can advantageously be extended without it perhaps being necessary to make the drawing chamber larger than would otherwise be necessary and to provide an additional bridge. Furthermore, disturbing impurities in the glass are avoided, since the heater elements are arranged in protective housings which are mechanically and chemically resistant to the attack by the glass melt.

Figure 3:
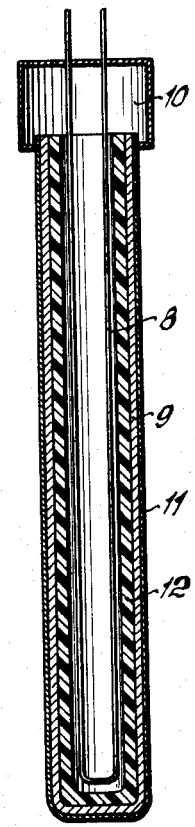
Figure 2:
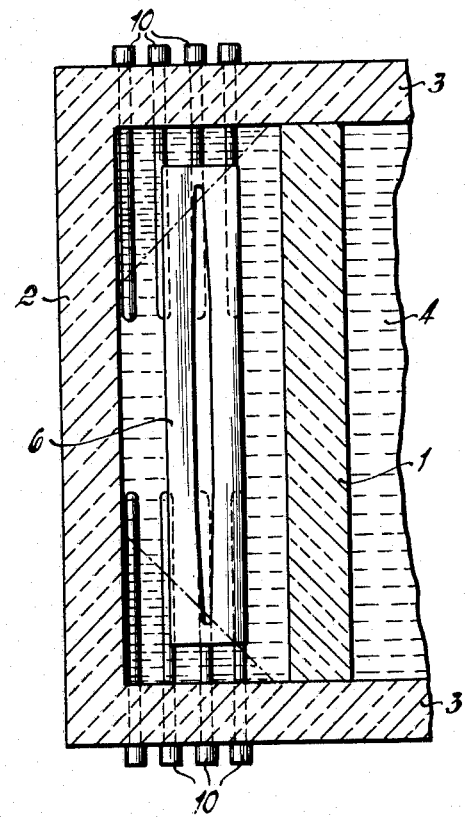

Other details of the invention will be apparent from the following description of the embodiment which is shown by way of example in the drawing, wherein:

FIGURE 1 is a vertical longitudinal section through the lower part of the drawing chamber of a Fourcault drawing arrangement, FIGURE 2 is a horizontal section through the drawing chamber on the line II—II of FIGURE 1, FIGURE 3 is a heater element shown to a larger scale, and FIGURE 4 is a plan view of an installation comprising several drawing devices and drawing chambers.

The drawing chamber shown in FIGURES 1 and 2 is constructed in the usual manner and has the usual dimensions. It is defined by the bridge 1 towards the adjacent melting tank which is not shown in detail and by the outside wall 2 at the opposite end. The side walls of the drawing chamber are indicated at 3. The drawing nozzle 6 is arranged in the usual manner in the drawing chamber at the height of the level 5 of the glass melt 4.

With a drawing chamber constructed in this manner, heat losses occur in each drawing period, approximately in the parts indicated by broken lines and hatching, which parts generally constitute flow-free zones, this heat loss being caused by heat radiation through the bottom 7 and the outer and side walls 2 and 3 and leading to the formation of the harmful devitrification lumps. In order that this can be prevented, the glass melt is heated according to the invention in the immediate vicinity of that part of the bottom 7 which is beneath the drawing nozzle 6 and of the outer and side walls 2, 3 by uniform supply of additional heat, the heating being to such an extent that the heat loss due to radiation is compensated for. For this purpose, heater elements are arranged in the immediate region of the bottom 7 and the outer and side walls 2, 3, the said elements being protected against action by the glass melt both from a mechanical and a chemical point of view. In the constructional example illustrated, these heater elements are formed by electric resistance heaters in the form of heater coils 8, which are individually arranged in protective or heating tubes 9. The heating tubes 9 provided with internal insulation 12 and containing the heater coils 8 are introduced into the drawing chamber, as indicated in FIGURE 2, from both longitudinal sides and through the side walls 3 of the chamber, and are so arranged that, in the region of the hatched flow-free zones, they are situated just above the bottom 7 in spaced juxtaposition and, just before the outside wall 2, they are disposed in spaced superimposed relation. Separate connecting caps 10 are provided for the connection of the current.

As will be seen from FIGURE 2, the heater elements can all for example be made of the same length and arranged with equal spacings. The protective or heater tubes 9 advantageously consist of steel and are provided with a flame-sprayed coating 11 (for example of oxides of the third and fourth groups of the Periodic System, such as aluminium oxide), which makes them mechanically and chemically resistant to the action of the glass melt. By means of these heater elements, which can also be differently constructed, the glass melt is additionally heated during the drawing period to a temperature which is for example 20°–30° C. above the upper devitrification point of the glass and which can be about 950°–960° C., whereas the temperature of the glass melt in the current-free zones is otherwise generally in the region of 800° C. The heating and protecting tubes 9 can be of a length which is somewhat shorter than half the width of the drawing chamber, so that the middle portion of the glass melt remains unheated. If required, the length of the heater tubes could also be such that it increases or decreases in the corners, corresponding to the form of the flow-free zones. In special cases, however, the heater tubes 9 with the heater coils 8 could also be of such a length that they pass transversely through the drawing chamber. Moreover, the mutual spacings of the heater tubes 9 can vary and the heater tubes 9 can possibly even be arranged with the mutual contact.

FIGURE 4 shows several arrangements corresponding in detail to those of FIGURES 1, 2 and 3, constituting a so-called nine-machine installation. In this installation, three drawing arrangements or drawing sections $Z_1$, $Z_2$, $Z_3$, each with three drawing chambers or drawing machines, $Ma_1$, $Ma_2$, $Ma_3$; $Ma_4$, $Ma_5$, $Ma_6$ and $Ma_7$, $Ma_8$, $Ma_9$ are arranged at the end of the tank W. It will be seen from FIGURE 4 that in such an installation, the position of the separate drawing chambers or machines relatively to the heat-radiating walls of the drawing devices or sections in question is different. The machines $Ma_2$, $Ma_5$ and $Ma_8$ which are arranged at the heads of the sections $Z_1$, $Z_2$, $Z_3$ and which are situated transversely of the longitudinal axis of the relevant drawing section $Z_1$, $Z_2$, $Z_3$ have in each case two radiating side walls and are consequently heated by heater tubes introduced from both sides through the side walls and fitted with the caps 10. The machines $Ma_1$, $Ma_3$; $Ma_4$, $Ma_6$ and $Ma_7$ and $Ma_9$, which are arranged parallel to the longitudinal axis of the drawing section in question, have only one cold side and consequently are only heated from one side.

What is claimed is:

1. Apparatus for preventing the formation of devitrification lumps in the flow-free zones of the drawing chambers of sheet glass drawing devices having side walls, an end wall and a bottom comprising additional heater means including electrical resistance elements, a protective housing for each element particularly resistant to the action of the glass flux, said elements extending through the side walls of the drawing chambers parallel to the end wall thereof in such a way that said elements extend in the drawing chamber substantially horizontally and just above the bottom thereof in spaced juxtaposition and closely adjacent the end wall in spaced superimposed relation.

2. Apparatus according to claim 1, characterized in that the protective housing for the resistance heater elements consists of steel, which is provided with a flame-sprayed insulating coating, advantageously of oxides of the third and fourth groups of the Periodic System, such as aluminum oxide.

3. Apparatus according to claim 1, in which the resistance elements are in the form of coils.

4. Apparatus as claimed in claim 1, characterised in that the heater housings are introduced from both sides into the drawing chamber.

5. Apparatus as claimed in claim 4, characterised in that the heater housings have a length which is somewhat shorter than half the width of the drawing chamber.

6. Apparatus as claimed in claim 1, characterised in that all heater housings have the same length.

7. Apparatus as claimed in claim 1, for drawing chambers of sheet glass drawing arrangements, in which several drawing chambers are arranged at the head end of a drawing arrangement forming a drawing section, characterised in that with the drawing chambers arranged transversely of the longitudinal axis of the drawing section, the heater housings are introduced from both sides through the two side walls into the drawing chamber, whereas with the drawing chambers arranged parallel or substantially parallel to the longitudinal axis of the drawing section, the heater housings are only introduced from the outer, cold side wall into the drawing chamber.

References Cited in the file of this patent

UNITED STATES PATENTS

| | | |
|---|---|---|
| 1,781,917 | Drake | Nov. 18, 1930 |
| 1,827,472 | Hitner | Oct. 13, 1931 |
| 2,274,986 | Kilian et al. | Mar. 3, 1942 |
| 2,600,490 | De Voe | June 17, 1952 |
| 2,635,388 | Peyches et al. | Apr. 21, 1953 |
| 2,658,093 | La Burthe | Nov. 3, 1953 |
| 2,749,379 | Geffcken et al. | June 5, 1956 |